United States Patent

Mosier et al.

[15] 3,680,032

[45] July 25, 1972

[54] PRINTED CIRCUIT BOARD CONNECTOR ASSEMBLY

[72] Inventors: John L. Mosier, Kane; Richard J. Peterson, Warren, both of Pa.

[73] Assignee: Sylvania Electric Products, Inc.

[22] Filed: Jan. 7, 1971

[21] Appl. No.: 104,640

[52] U.S. Cl. ......................339/17 F, 317/101, 339/75 MP, 339/176 MP

[51] Int. Cl. ......................H01r 11/32, H05k 1/02

[58] Field of Search ..........339/17, 18 C, 18 R, 75 M, 75 MP, 339/119, 125, 128, 176 M, 176 MP, 176 MF, 196 M, 217, 218, 220, 221; 174/68.5, 117; 317/101 DH

[56] References Cited

UNITED STATES PATENTS

| | | | |
|---|---|---|---|
| 3,189,863 | 6/1965 | Leach | 339/99 R |
| 3,328,749 | 6/1967 | Kukla | 339/221 R |
| 3,497,952 | 3/1970 | King et al. | 339/218 R X |
| 3,434,093 | 3/1969 | Wedekind | 339/17 F |
| 3,335,393 | 8/1967 | Anderson | 339/176 MP X |

*Primary Examiner*—Marvin A. Champion
*Assistant Examiner*—Terrell P. Lewis
*Attorney*—Norman J. O'Malley, Donald R. Castle and William H. McNeill

[57] ABSTRACT

A printed circuit board connector assembly utilizing an insulating body having a plurality of pliable metallic contacts established therein. Each of these contacts has an upper elongated portion for contacting the side of a printed circuit board, a central portion for retaining the contact within the insulating body, and a lower wedge-shaped portion which extends from beneath the insulating body and penetrates the insulating material of a flat cable and contacts an electrically conducting wire located therein. This connection is accomplished when the insulating body is forced against a corresponding cover member, compressing the flat cable between.

8 Claims, 4 Drawing Figures

PATENTED JUL 25 1972

3,680,032

INVENTORS.
JOHN L. MOSIER &
RICHARD J. PETERSON
BY

Donald R. Castle
ATTORNEY

PRINTED CIRCUIT BOARD CONNECTOR ASSEMBLY

BACKGROUND OF THE INVENTION

This invention relates to electrical connectors and, more particularly, to connectors for providing electrical contact between the contact surfaces of printed circuit boards and corresponding electrically conducting wires encased within flat cables. To effect this contact, the technique of piercing the insulative covering of the cable is utilized.

Technology in today's electronic field has dictated the necessity for miniaturization of electrical components and circuitry. In particular, new methods of wiring are called for which reduce high labor costs by eliminating the need for handling and soldering of individual wires, as well as the stripping of insulation from these wires prior to connection. To accomplish this, the flat cable, having several individual wires established in a substantially parallel, side by side relationship and compressed between two layers of insulating material, has been developed. In conjunction with the cable, methods have been developed for piercing the insulation about the wires and directly contacting them. Various types of insulated housings, having penetrating metallic contacts located therein, have been used to provide such contact. The basic design for contacts of this variety has usually consisted of a sharp piercing edge on one end and a wirewrap or solderable portion on the other. While this design has succeeded in penetrating the insulating material of the flat cable, repeated assembly and disassembly of the housing member to effect new connections has resulted in the misalignment of these contacts. And because this type of connector has contacts utilizing ends designed for wirewrapping or soldering, the need for individual handling of remaining wiring to complete the connection still remains.

It is believed, therefore, that a connector designed to receive a printed circuit board and to electrically connect the contact surfaces of this board with individual wiring located within a flat cable without the need for individual handling, wirewrapping, soldering, etc. would be an advancement in the art.

OBJECTS AND SUMMARY OF THE INVENTION

Consequently, it is a primary object of the invention to provide a new method of making electrical connections between the contact surfaces of a printed circuit board and the individual wires located within a flat cable.

It is another object of this invention to provide an electrical connection between a printed circuit board and a flat cable without the need for individual handling, wire-wrapping, and soldering of wiring.

It is a further object of this invention to provide a connector in which the contacts located within the connector are retained within their original positions after repeated assembly and disassembly of the connector.

It is a still further object of the invention to provide an easy-to-operate connector having a small number of components.

In accordance with one aspect of this invention, there is provided a connector assembly for receiving a printed circuit board. Established within the insulating body of this assembly are a plurality of pliable metallic contacts, each having an upper elongated portion for contacting the printed circuit board, a central portion for retaining the contact within the insulating body, and a lower portion for penetrating the insulating material of a flat cable and contacting one of several electrically conducting wires encased therein. This penetration occurs when the insulating body is forced against a U-shaped cover member, compressing the flat cable between the two members.

DESCRIPTION OF THE PREFERRED EMBODIMENTS

For a better understanding of the present invention, together with other and further objects, advantages, and capabilities thereof, reference is made to the following specification and appended claims in connection with the following drawings.

As previously mentioned, there is provided a connector for receiving a printed circuit board. Within the insulating body of this connector are a plurality of pliable metallic contacts which have upper elongated portions for contacting the circuit board. The central portion of the contacts hold them within the insulating body while the lower portions, having sharp penetrating edges, pierce the insulating material of a flat cable and directly contact individual wires located therein. To assure that the flat cable maintains its position and is properly aligned, a U-shaped cover member is fitted over the insulating body and attached thereto, compressing the flat cable between. To more fully illustrate the previously described connector, a detailed description of the drawings is provided.

Figure 1:
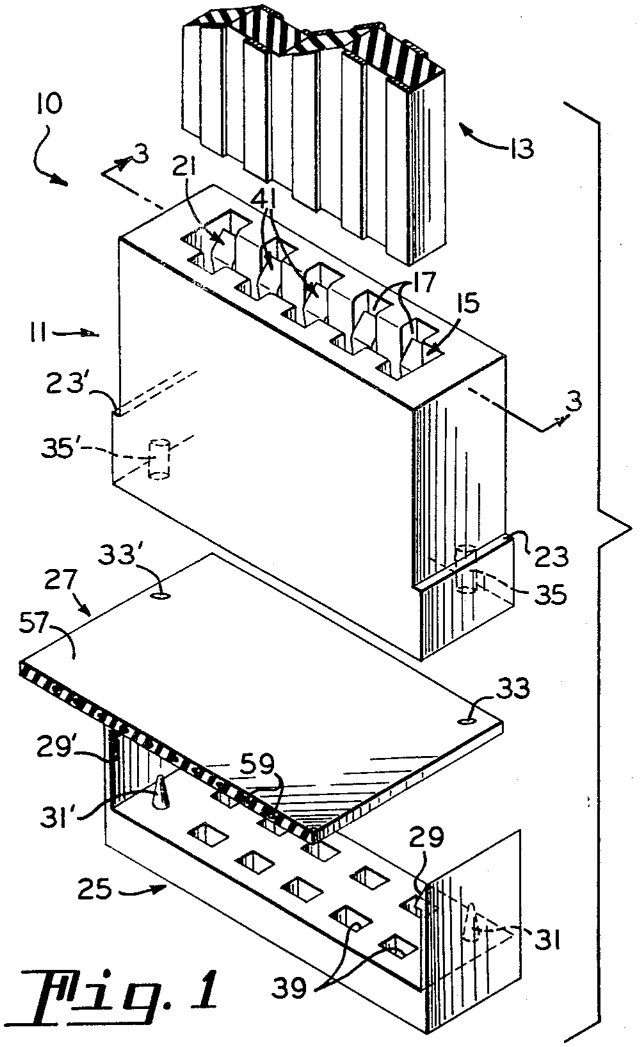
FIG. 1 is an exploded isometric view of the present invention.

Referring first to FIG. 1, the components which comprise printed circuit board connector assembly 10 are shown in an exploded isometric view. Insulating body 11 is shown about to receive a printed circuit board 13. To accomplish this, a substantially rectangular shaped channel 15 is provided. On each of the opposing longer sides of channel 15 are disposed a plurality of non-opposing indentations 17. Located within each of these indentations is the upper elongated portion 41 of a plurality of electrical contacts 21 which are better shown and will be further explained with the description of FIG. 2.

Positioned on the opposing ends of insulating body 11 are a pair of ledge members 23 and 23'. When the insulating body is pressed down against U-shaped cover 25, thus compressing flat cable 27 between the insulating body and the cover, hooklike members 29 and 29' mate with these ledge members 23 and 23' respectively, and provide a means whereby the insulating body 11, flat cable 27, and U-shaped cover 25 are rigidly affixed. To assure proper alignment of these three components, a pair of upstanding pins 31 and 31', located on U-shaped cover 25, are provided which align with apertures 33 and 33', respectively, located within flat cable 27. To properly align the insulating body 11, these pins extend through apertures 33 and 33' and enter cylindrical shaped openings 35 and 35', respectively, located within the insulating body.

Figure 4:
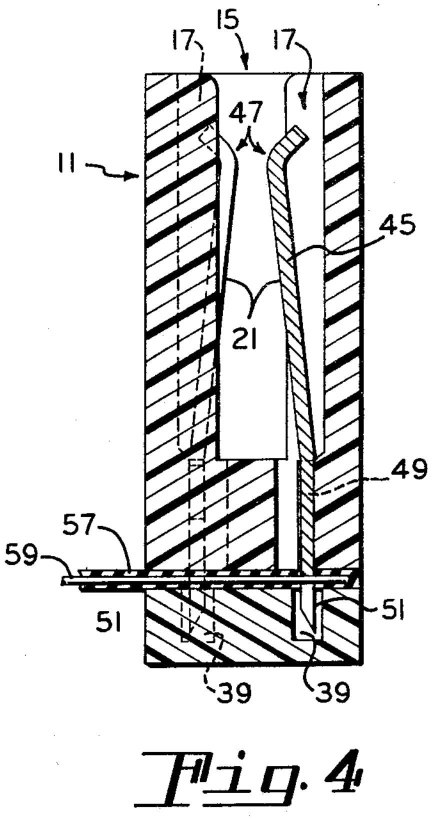
FIG. 4 is a side elevational view, in section, of the present invention completely assembled.

To accept the lower wedge-shaped portions 37 (shown in FIG. 2) of electrical contacts 21 which extend from beneath the insulating body 11 and whose function it is to pierce the flat cable 27 when these units are compressed together, a plurality of slots 39 are provided within U-shaped cover 25. FIGS. 3 and 4 will more clearly show how these components align.

Figure 2:
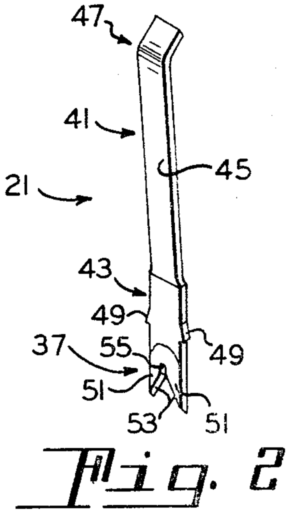
FIG. 2 is an isometric view of one of the electrical contacts located within the insulating body of the present invention.
Figure 3:
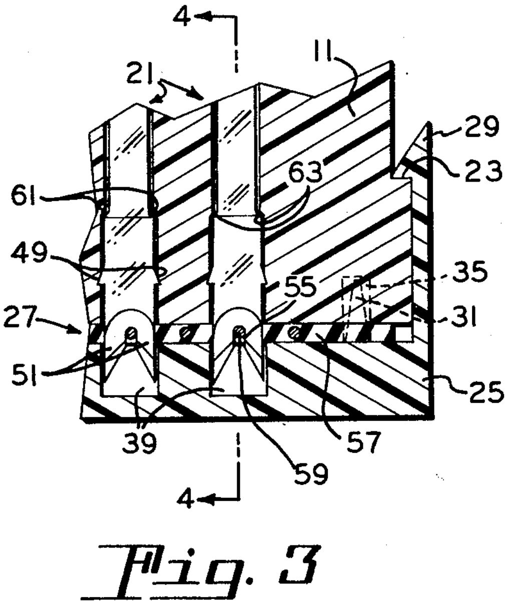
FIG. 3 is a partial front elevational view, in section, taken along the lines 3—3 of FIG. 1.

In FIG. 2 can be seen one of the several electrical contacts 21 which are housed within insulating body 11. Each of these contacts has an upper elongated portion 41, a central retaining portion 43 and a lower wedge-shaped portion 37. Upper elongated portion 41 is formed so that leg portion 45 bends inwardly toward the center of substantially rectangular shaped channel 15 (shown in FIG. 1) when the contact is positioned within the insulating body. At the upper end of leg 45 is angled portion 47 which directly contacts the printed circuit board. Angled portion 47 is formed so as to bend out from the surface of the circuit board, thereby providing means whereby the circuit board may enter channel 15 more easily.

Located on central portion 43 are a pair of protruding barb members 49. The purpose of these barb members is to penetrate the internal walls of the insulating body and thereby retain the contact in a substantially rigid relationship within the body. Lower wedge-shaped portion 37 comprises a pair of external leg members 51 which each have an inward leading edge 53. These edges meet and form a coined slot 55. Lower portion 37 is termed as wedge-shaped because each of the extended leg members 51, in addition to having the inward leading edge 53, are angled from front to back, thereby forming a wedge and making it much easier to penetrate the flat cable 27. This angle may be better seen in FIG. 4.

As the insulating body 11 is forced against U-shaped cover 25, compressing the flat cable 27 between, lower wedge-shaped portions 37 of the electrical contacts 21 pierce the insulating material 57 of the flat cable and contact the wires 59 located therein, as shown in FIG. 3 and FIG. 4. These wires are positioned in a substantially parallel side-by-side relationship, as is the procedure for most flat cables. It is the function of each of electrical contacts 21 to pierce the insulating material 57 and contact a corresponding wire 59 within the cable. Because the contacts are spaced apart within the insulating body, and the wires are separated within the insulating material, it can be seen that when the insulating body 11, flat cable 27, and U-shaped cover 25 are joined together, a plurality of individual circuits are formed. In FIG. 3 only the contacts on one side of the insulating body are shown contacting the wires and as a result only every other wire is joined. However, all wires within the cable are contacted, and those not shown as being so are actually contacted by the electrical contacts on the opposing side of the insulating body. FIG. 3, being a sectional view taken through the center of substantially rectangular shaped channel 15 does not show this, but in FIG. 4 the contacts on both sides of the channel 15 may be seen. Upstanding pin 31 may be seen in FIG. 3 as it has extended through flat cable 27 and entered cylindrical shaped opening 35. The final position of electrical contacts 21 are shown as they have contacted wires 59 after piercing the insulating material 57. Extending leg members 51 have entered corresponding slots 39 within U-shaped cover 25 while protruding barb members 49 have penetrated the internal walls of the insulating body 11, rigidly affixing the contacts in position. To provide additional means whereby the contacts 21 are maintained within the insulating body 11, a pair of lip members 61 are formed upon the central portions of the contacts. These lip members 61 restrict any possible upward movement of the contact by mating with corresponding indented edges 63 formed on the internal walls of the insulating body 11.

While there have been shown and described what are presently considered the preferred embodiments of this invention, it is obvious to those skilled in the art that various changes and modifications may be made therein without departing from the scope of the invention as defined by the following claims.

We claim:

1. A printed circuit board connector assembly comprising:

an insulating body of predetermined length having an elongated slot located therein for receiving said printed circuit board;

a substantially U-shaped cover of insulating material having a pair of opposing upstanding wall members, each of said wall members having means located thereon for attaching to said insulating body;

a substantially flat cable of insulating material, said cable having a plurality of substantially parallel electrically conducting wires encased therein, said wires being transversely aligned between said insulating body and said substantially U-shaped cover;

a plurality of electrical contacts located within said insulating body, each of said contacts having an upper elongated portion within the elongated slot having means for contacting said printed circuit board, a central portion having means for retaining said contact within said insulating body, and a lower wedge-shaped portion formed to pierce said flat cable, each of said lower wedge-shaped portions having means for contacting one of said electrically conducting wires encased within said cable.

2. The printed circuit board connector assembly according to claim 1 in which said elongated slot for receiving said printed circuit board comprises a substantially rectangular shaped channel having a plurality of indentations located therein, said indentations being equally disposed in a non-opposing relationship along both longer opposed sides of said substantially rectangular shaped channel.

3. The printed circuit board connector assembly according to claim 1 in which said means located on each of said opposing upstanding wall members of said U-shaped cover for attaching to said insulating body comprises a protruding hooklike member to mate with corresponding extending ledge members positioned on said insulating body.

4. The printed circuit board connector assembly according to claim 2 in which each of said upper elongated portions of said electrical contacts are positioned within each of said indentations of said rectangular shaped channel.

5. The printed circuit board connector assembly according to claim 4 in which said means for contacting said printed circuit board comprises a formed upper elongated portion which bends inwardly within said substantially rectangular shaped channel and has at each end of said upper elongated portion a formed angled portion, said angled portion being bent outward from the contact surfaces of said printed circuit board when said printed circuit board is inserted within said channel.

6. The printed circuit board connector assembly according to claim 1 in which said means for retaining said contact within said insulating body comprises a pair of protruding barb members, said barb members penetrating the interior walls of said insulating body.

7. The printed circuit board connector assembly according to claim 1 in which said means for contacting one of said electrically conducting wires encased within said substantially flat cable comprises a coined slot having inward leading edges, said edges formed to guide said wire into said slot.

8. The printed circuit board connector assembly according to claim 5 in which said means located on each of said opposing upstanding wall members of said U-shaped cover for attaching to said insulating body comprises a protruding hooklike member to mate with corresponding extending ledge members positioned on said insulating body; said means for retaining said contact within said insulating body comprises a pair of protruding barb members, said barb members penetrating the interior walls of said insulating body; and said means for contacting one of said electrically conducting wires encased within said substantially flat cable comprises a coined slot having inward leading edges, said edges formed to guide said wire into said slot.

* * * * *